United States Patent Office 2,738,345
Patented Mar. 13, 1956

2,738,345

CHROME-CONTAINING MONOAZO DYESTUFFS

Guido Schetty, Basel, Switzerland, assignor to J. R. Geigy A. G., Basel, Switzerland, a Swiss firm No Drawing. Application July 14, 1952,
Serial No. 298,827

Claims priority, application Switzerland August 8, 1951

8 Claims. (Cl. 260—147)

The production of chrome containing monoazo dyestuffs is described in U. S. Patent No. 2,551,056. These dyestuffs are water soluble complex chrome compounds of o.o'-dihydroxy azo dyestuffs which do not contain the acid water solubilising groups usual in azo dyestuffs. Due to their good affinity to protein fibres, they are suitable for the fast dyeing of wool and polyamide fibres under conditions which do not injure the fibres. The water solubility of these complex chrome compounds is due to the presence in the dyestuff molecule of an aromatically bound methyl sulphone group, i. e. in contrast to the water solubilising groups usual up to now in water soluble synthetic dyestuffs such as e. g. the sulphonic acid and the carboxyl group, they contain a group which is not capable of ionisation.

While at that time the attainment of a water solubility sufficient for dyeing purposes appeared to be possible only when there was a methyl sulphone group present, the lowest member of the alkyl sulphonyl groups, further work on this subject showed that in certain exceptional cases a sufficient water solubility of the complex chrome compounds could be attained also with alkyl sulphonyl groups having alkyl radicals with more than one C atom and no acid water-solubilising groups as substituents in o.o'-dihydroxy azo dyestuffs.

It was found that by chroming o.o'-dihydroxy azo dyestuffs of the general formula I:

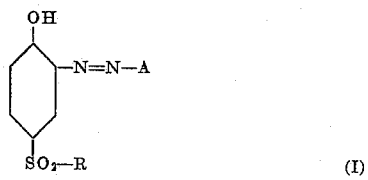

(I)

wherein:

R represents a low molecular alkyl radical having at least 2 carbon atoms and

A represents a coupling component having no acid water-solubilising groups and chosen from the 1-phenyl-3-methyl-5-pyrazolones group and the 1-acylamino-7-hydroxy-naphthalenes, in the usual manner with chromium-yielding agents, water soluble complex chrome compounds can be obtained. Contrasted with the compounds mentioned above, according to the composition, the new compounds are distinguished by an improved drawing power on to wool from a neutral to weakly acid bath and they also produce very fast and level dyeings.

The monoazo dyestuffs according to the present invention are obtained from diazotised 4-alkyl sulphonyl-2-aminophenols with a low molecular alkyl radical having at least 2 carbon atoms by coupling with 1-phenyl-3-methyl-5-pyrazolones which may also contain the non-ionisable substituents usual in azo dyestuffs in the phenyl radical such as halogen or alkyl groups or by coupling with 1-acylamino-7-hydroxynaphthalenes having a low molecular acyl radical, preferably an acetyl radical. The diazo components which can be used can be obtained for example from p-chlorophenyl sulphinic acid by alkylating with diethyl sulphate, propyl or butyl bromide, nitrating, replacing the halogen atom by a hydroxyl group using caustic alkalies while heating, and reducing the nitro group to the amino groups.

The o.o'-dihydroxy azo dyestuffs usable according to the present invention are chromed according to the usual methods, preferably in a neutral to alkaline medium. The method using complex chrome compounds of o-hydroxycarboxylic acids of the benzene series is particularly suitable. Thorough mixing of the complex chrome compounds with wetting and dispersing agents and with salts alkaline in reaction such as alkali carbonates, alkali pyro- and meta-phosphates is indispensable for the attainment of sufficient water solubility.

Apart from the dyeing of wool and similar fibres made up from superpolyamides, superpolyurethanes and casein, the new chrome-containing dyestuffs are also suitable for the dyeing of silk and leather, in particular of glacé leather.

The following examples illustrate the invention without limiting it in any way. Where not otherwise stated, parts are given as parts by weight and the temperatures are in degrees centigrade. The relationship of parts by weight to parts by volume is that of kilogrammes to litres.

Example 1

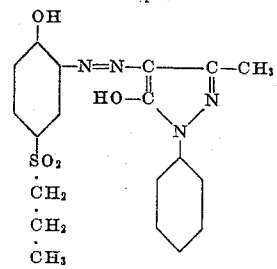

21.5 parts of 2-aminophenol-4-n-propyl sulphone in 200 parts of water and 17.5 parts of concentrated hydrochloric acid are diazotised at 0–5° with a sodium nitrite solution (corresponding to 6.9 parts of $NaNO_2$ 100%). The diazo compound is then neutralised to Congo red with sodium bicarbonate and poured into a solution of 18 parts of 1-phenyl-3-methyl-5-pyrazolone in 250 parts of water and 20 parts of sodium carbonate. On completion of the coupling, the product is heated to 70°. The dyestuff is salted out, filtered off and, in 400 parts of water, is boiled under reflux with a solution of ammonium chromo-salicylate (corresponding to 4.2 parts of $Cr_2O_3$). The chrome-containing dyestuff is precipitated with sodium chloride, filtered off and dried. It is an orange powder which easily dissolves in water when mixed with soda. It dyes wool from a neutral or weakly acid bath in orange shades which have very good fastness properties.

A dyestuff with similar properties is obtained if instead of 18 parts of 1-phenyl-3-methyl-5-pyrazolone, 19.7 parts of 1-(3'- or 4'-methylphenyl)-3-methyl-5-pyrazolone is used as coupling component or if 20.1 parts of 2-aminophenol-4-ethyl sulphone is used as diazo component.

Example 2

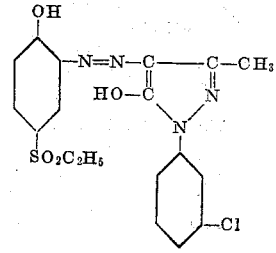

20.1 parts of 2-aminophenol-4-ethyl sulphone in 150 parts of water and 17.5 parts of concentrated hydrochloric acid are diazotised at 0–5° with a solution of sodium nitrite (corresponding to 6.9 parts of NaNO₂ 100%). The diazo compound is then neutralised with sodium bicarbonate and a further 3 parts of sodium bicarbonate are added whereupon it is poured at 0–5° into a solution of 22 parts of 1-(3'-chlorophenyl)-3-methyl-5-pyrazolone in 200 parts of water and 6 parts of sodium hydroxide. After 3 hours, the dyestuff is formed. It is salted out at 80°, isolated and filtered off. While still damp, the dyestuff is suspended in 200 parts of water and then heated under reflux with a solution of ammonium chromo-salicylate (corresponding to 4.2 parts of $Cr_2O_3$) until no more original dyestuff can be traced. The chrome-containing dyestuff is precipitated by the addition of sodium chloride, filtered off and dried. It is an orange powder which is soluble in hot water and it dyes wool from a neutral or weakly acid bath in orange shades which have good washing, milling and sea water fastness properties. The dyeings are distinguished by their evenness and good fastness to light.

*Example 3*

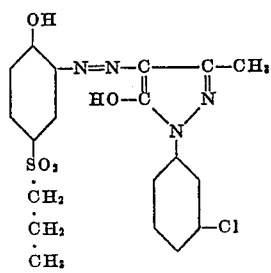

21.5 parts of 2-aminophenol-4-n-propyl sulphone in 200 parts of water and 17.5 parts of concentrated hydrochloric acid are diazotised at 0–5° with a sodium nitrite solution (corresponding to 6.9 parts of NaNO₂ 100%). The diazo compound is neutralised with sodium bicarbonate and a further 3 parts of sodium bicarbonate are then added. A solution of 22 parts of 1-(3'-chlorophenyl)-3-methyl-5-pyrazolone in 200 parts of water and 6 parts of sodium hydroxide is then added to the suspension at 0–5°. The whole is stirred overnight after which the dyestuff is formed. It is heated to 70° and after salting out, the dyestuff is filtered off. While still damp, the nonchrome-containing dyestuff is pasted in 400 parts of water and boiled under reflux for several hours with a solution of ammonium chromo-salicylate (corresponding to 4.2 parts of $Cr_2O_3$), whereupon the chrome-containing dyestuff precipitates. After filtering off and drying, the dyestuff is in the form of an orange powder which, after mixing with soda, dissolves well in water. It dyes wool from a neutral or weakly acid bath in very level orange shades which have very good wet fastness properties and very good fastness to light.

*Example 4*

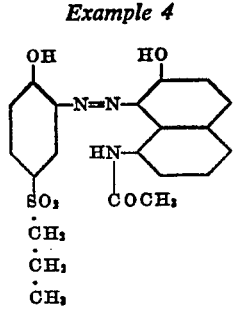

21.5 parts of 2-aminophenol-4-n-propyl sulphone in 200 parts of water and 17.5 parts of concentrated hydrochloric acid are diazotised at 0–5° with a sodium nitrite solution (corresponding to 6.9 parts of NaNO₂ 100%). The diazo compound is neutralized with sodium bicarbonate and poured at 0–5° into a solution of 21.1 parts of 1-acetylamino-7-naphthol in 200 parts of water and 4.2 parts of sodium hydroxide and 15 parts of sodium carbonate. When the dyestuff formation is complete, the suspension is quickly heated to 80°, sodium chloride is added and the precipitate is filtered off. The damp dyestuff in 300 parts of water is then boiled under reflux with a solution of ammonium chromosalicylate (corresponding to 4.2 parts of $Cr_2O_3$) until the complex formation is complete. When cool, the greater part of the chrome-containing dyestuff has precipitated. It is filtered off and dried. To attain perfect solubility, the dyestuff is mixed with 40% of its weight of dehydrated soda and 10% of "Eriopon AC." The dyestuff is a blue-black powder which dyes wool from a neutral to weakly acid bath in grey shades which have very good fastness to washing, milling, sea water and light.

*Example 5*

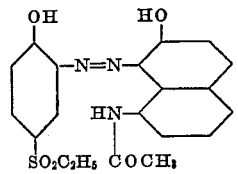

20.1 parts of 2-aminophenol-4-ethyl sulphone are stirred in 150 parts of water and 17.5 parts of concentrated hydrochloric acid and diazotised at 0–5° with a sodium nitrite solution (corresponding to 6.9 parts of sodium nitrite 100%). The diazo compound suspension is neutralised with sodium bicarbonate and then poured at 0–5° into a solution of 21.1 parts of 1-acetylamino-7-naphthol in 200 parts of water and 4.2 parts of sodium hydroxide and 15 parts of sodium carbonate. When the dyestuff formation is complete, the suspension is quickly heated to 80°, sodium chloride is added and the precipitate is filtered off. The chrome-free dyestuff in 1000 parts of water is then boiled under reflux with a solution of ammonium chromosalicylate (corresponding to 4.2 parts of $Cr_2O_3$) until the complex formation is complete which is for about 1 hour. The dyestuff is isolated by filtration after adding sodium chloride. After drying, the dyestuff is a blue-black powder which dyes wool from a neutral bath in grey shades. The dyeings have very good wet fastness properties and very good fastness to light. To attain perfect water solubility, the dyestuff is mixed with sodium carbonate.

What I claim is:

1. The chromium complex of a monoazo dyestuff containing no sulphonic acid and carboxylic acid groups and corresponding to the formula:

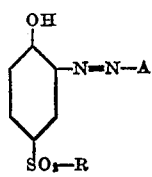

wherein:
R represents a low molecular alkyl radical containing at least two carbon atoms and
A represents the radical of a member selected from the group consisting of 1-phenyl-3-methyl-5-pyrazolones and 1-acylamino-7-hydroxynaphthalenes, acyl meaning a low molecular fatty acid radical.

2. The chromium complex of a monoazo dyestuff of the formula:

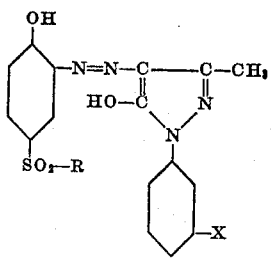

wherein:
R represents a low molecular alkyl radical containing at least two carbon atoms and
X represents a member selected from the group consisting of H and Cl.

3. The chromium complex of a monoazo dyestuff of the formula:

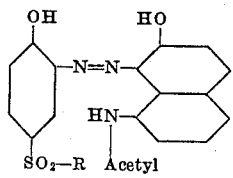

wherein R represents a low molecular alkyl radical containing at least two carbon atoms.

4. The chromium complex of a monoazo dyestuff of the formula:

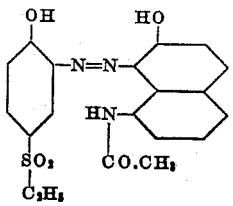

5. The chromium complex of a monoazo dyestuff of the formula:

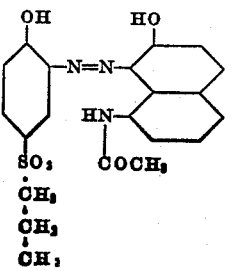

6. The chromium complex of a monoazo dyestuff of the formula:

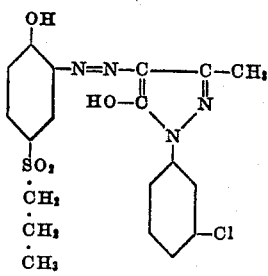

7. The chromium complex of a monoazo dyestuff of the formula:

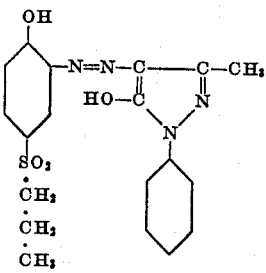

8. The chromium complex of a monoazo dyestuff of the formula:

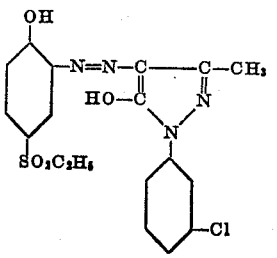

References Cited in the file of this patent
UNITED STATES PATENTS

| | | |
|---|---|---|
| 2,203,818 | Fleischhauer et al. | June 11, 1940 |
| 2,387,987 | Felix et al. | Oct. 30, 1945 |
| 2,551,056 | Schetty | May 1, 1951 |